Fig. 2

Inventor
Edward B. Heckenkamp
by John P. Hines
Attorney

United States Patent Office 3,050,037
Patented Aug. 21, 1962

3,050,037
TRACTOR-IMPLEMENT HYDRAULIC
CONTROL SYSTEM
Edward B. Heckenkamp, Wauwatosa, Wis., assignor to
Allis-Chalmers Manufacturing Company, Milwaukee,
Wis.
Filed Nov. 27, 1959, Ser. No. 855,705
19 Claims. (Cl. 121—46.5)

This invention pertains to the combination of a tractor, an attached implement and a fluid pressure system therefor in general and more particularly to such a combination wherein the system includes a delay action unloading valve which will bypass short surges of high press fluid without interrupting the operation of the combination.

In a farm tractor when an operator wishes to lift a heavy implement attached to the tractor to a raised or transport position he moves a hand control lever to the fully raised position and a high pressure pump on the tractor immediately delivers a large quantity of high pressure fluid to a lifting ram. This action causes the ram to extend and lift the implement. When the ram has reached the fully raised or extended position it is necessary to provide a means for bypassing the pressurized fluid back to the reservoir before it builds up to such a pressure that the tractor stability would be in jeopardy and/or ultimately the fluid lines would burst. The system pressure can be relieved by utilizing a standard relief valve. However, this relief valve would direct the pressurized fluid to the reservoir at the maximum high pressure which is necessary for the proper operation of the lift ram. By retaining the high pressure in the system the fluid has a tendency to heat and damage to the system can result. It is therefore standard practice to incorporate an additional valve working in conjunction with a relief valve whereby this additional valve holds the relief valve in an open position at a lower pressure than is required to unseat the relief valve thereby overcoming the undesirable heating effect.

In the following description of the invention reference will quite often be made to an unloading valve. As used herein an unloading valve is composed of a conventional relief valve operative to open at a first pressure and an additional valve connected to the relief valve and operative to open at a pressure lower than the first pressure and to hold the relief valve open at the lower pressure. Furthermore, the valves are arranged in series so that the fluid acting on the additional valve must first pass through the relief valve.

Although a conventional unloading valve does exhibit the desirable characteristic of allowing the fluid in the system to pass to the reservoir at a pressure lower than the maximum relieving pressure it requires the pressure in the system to be lowered to a point beneath the unloading pressure before the relief valve will reseat and allow the maximum required pressure to be again attained. This is undesirable if the unloading valve is actuated before the desired operation is accomplished. As an example, a premature unloading of the system may occur when an operator attempts to quickly lift a heavy implement.

When the operator moves the hand control lever to the full lift position the system pump immediately delivers a large charge of high pressure fluid to the ram. Due to the attached implement's inherent tendency to resist movement, a pressure considerably higher than the normal pressure is momentarily built up in the system. Although this short surge of extremely high pressure fluid would not damage the system or jeopardize the stability of the tractor, in many cases it does unseat the unloading valve. As explained above this causes the fluid to be returned to the reservoir at a low pressure which will not exert sufficient force on the ram to lift the implement. It is then necessary for the operator to move the control lever to a full lower position which allows the unloading valve to reseat. This is bothersome and time consuming and is the undesirable characteristic of a conventional unloading valve which applicant's invention is directed to overcome.

It is therefore a general object of the invention to provide a combination of tractor, attached implement and pressure fluid system wherein short surges of high pressure fluid do not interrupt the proper functioning of the combination.

A further object of the invention is to provide the combination hereinbefore described with a delay action unloading valve wherein short surges of high pressure fluid will not open the valve.

A further object of the invention is to provide a combination of the above described character wherein changes in volume of fluid delivered to the unloading valve do not alter the functioning of the valve.

A further object of the invention is to provide an unloading valve with a surge chamber wherein short surges of high pressure fluid do not open the valve.

These and other objects and advantages of the invention will become more apparent as the following description is read in light of the accompanying drawings wherein.

Figure 1:
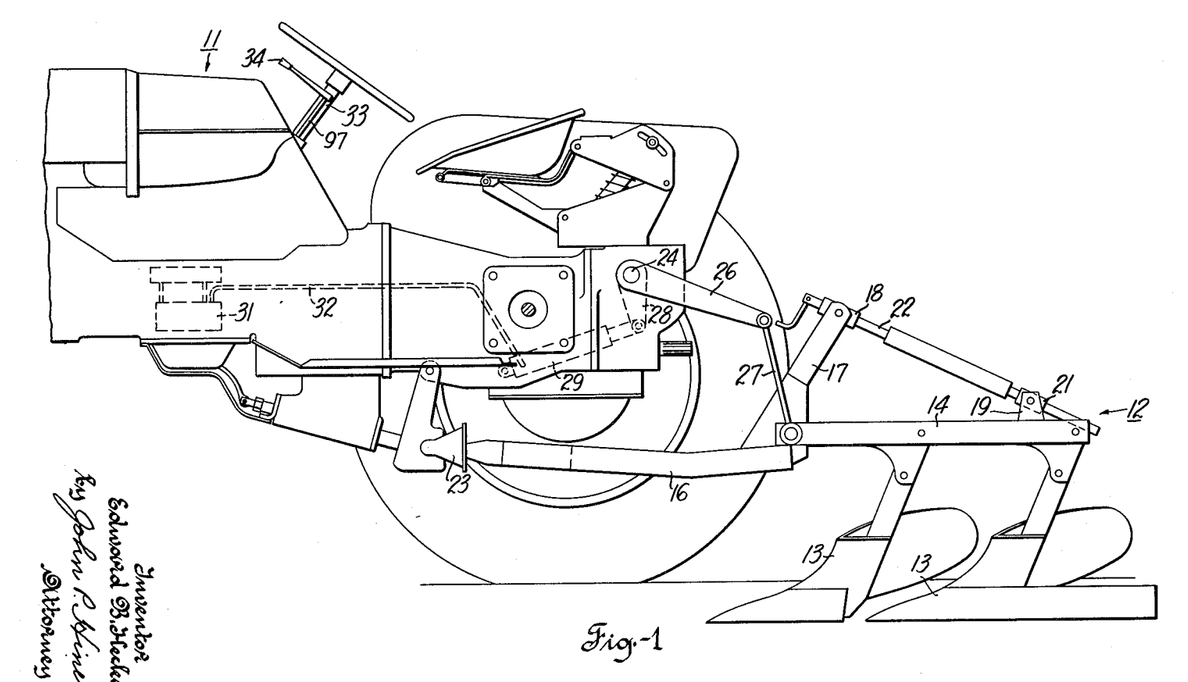
FIG. 1 is a side elevation of a tractor and implement combination with one drive wheel of the tractor removed to more fully show the hydraulic and mechanical lift mechanism.

Referring to FIG. 1 a farm tractor generally designated 11 has an implement 12 attached in propelled relation thereto. The implement disclosed for illustration is composed of ground engaging parts 13 connected to a frame member 14 in any conventional manner. A drawbar member 16 has its rearward end pivotally connected to the implement frame member 14. An upstanding bracket 17 rigidly connected to the drawbar 16 pivotally supports a threaded sleeve 18. An additional bracket 19 formed on the implement frame 14 pivotally supports an additional threaded sleeve 21. An elongated screw member 22 is passed through each threaded sleeve 18 and 21 thereby providing an adjustable rigid connection between the implement frame and the drawbar.

Depending from the tractor frame is a bell shaped member 23 which contains a connection for the other end of the drawbar providing a connection between the tractor and the implement. Pivotally connected to the rearward most housing of the tractor is a shaft 24. A lift arm 26 is connected to the shaft 24 for rotation therewith. This lift arm has its remote end connected to the implement frame 14 through a lift link 27. A crank arm 28 rigidly connected to the shaft 24 is acted upon by a hydraulic cylinder and piston combination or ram 29. A hydraulic pump 31 supplies fluid to the hydraulic ram through the fluid delivery conduit 32. Since the ram 29 is a single acting type the conduit 32 acts as both a supply and return line for the hydraulic fluid.

Arranged near the operator's station and attached to the tractor steering wheel post 33 is a lift-lower or hand control lever 34. Suitable linkage connects the lift-lower lever 34 to a control valve to control the delivery and return of fluid from the pump to the ram and from the ram to a reservoir.

Figure 2:
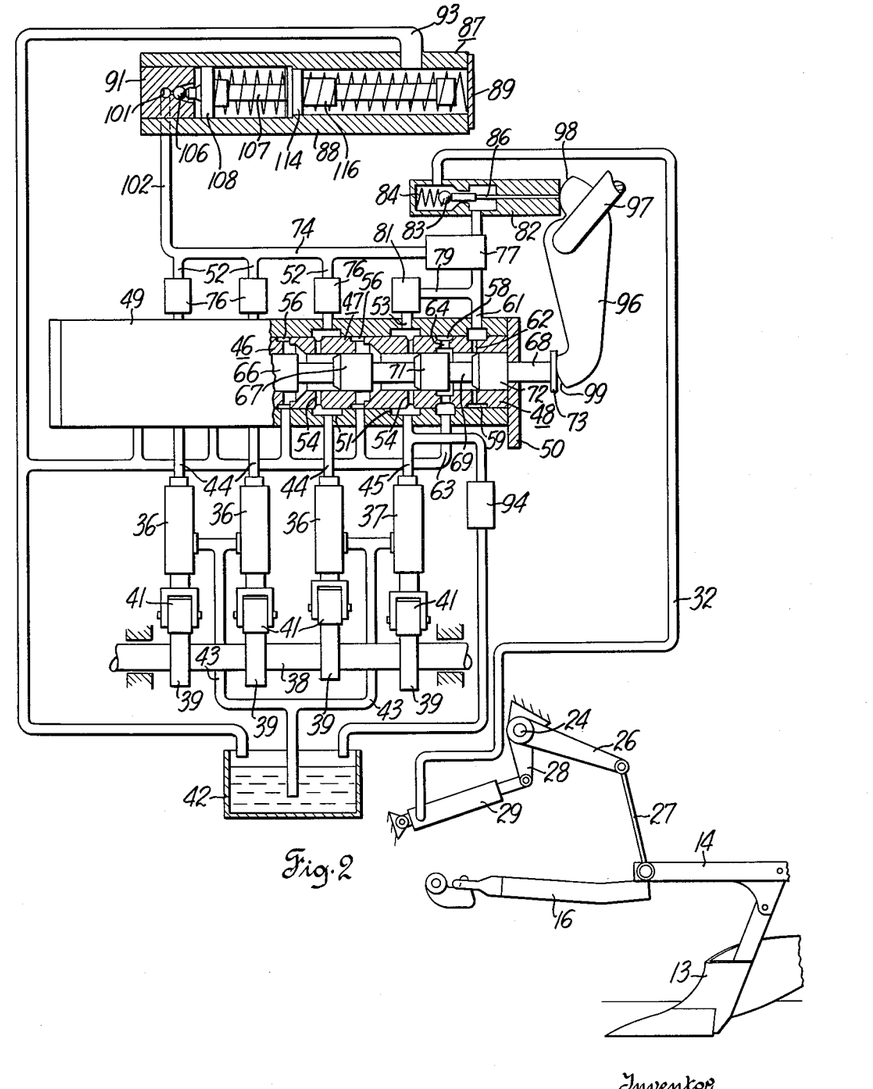
FIG. 2 is a schematic showing of a hydraulic lift system in combination with an implement connected to a hydraulic ram.

Referring to FIG. 2 the preferred form of hydraulic pump is composed of three large pump plungers 36 and one small pump plunger 37. A rotating shaft 38 of the internal combustion engine (not shown) of the tractor 11 is provided with a series of cams 39 which act on cam follower rollers 41 connected to the plungers or piston pumps 36 and 37 in any conventional manner. The plungers 36 and 37 are connected in fluid communication with a reservoir 42 by the pump supply lines 43 in a conventional manner so that as the plungers move downward, as viewed in FIG. 2, fluid is sucked into the piston pumps through the pump supply lines 43 from the reservoir 42. As the plungers move upward each supply line is cut off and the fluid is pressurized.

Each of the three large pumps is provided with a pump discharge passage 44 while the small pump is provided with a pump discharge passage 45. Each discharge passage 44 and 45 connects a pump to a common control means or valve including axially separable cylindrical liner sections 46, 47 and 48 disposed in cylindrical control valve casing 49 with the righthand section 48 abutting end plate 50. The cylindrical liner sections are provided with circumferential grooves 51 placing pump discharge passages 44 and 45 in communication with diametrically opposed transfer passages 52 and 53. In addition, each liner section is provided with a transverse bore 54 placing the interior of the liners in fluid communication with the grooves 51. The ends of the liner sections which abut one another are complementary shaped to form annular grooves 56. These grooves together with the relieved lefthand end abutting portions of the liner sections combine to place the interior of the cylindrical liner in fluid communication with a main return passage 63. In addition, the righthand liner section 48 is provided with two circumferential grooves 58 and 59. The groove 59 is in fluid communication with a working fluid or pressure fluid passage 61. A transverse bore 62 through the liner section 48 places diametrically opposed portions of groove 59 in communication with the interior of the liner section 48. The groove 58 communicates with main return passage 63 and with the interior of the cylindrical liner through the transverse bore 64.

A cylindical control valve is positioned in the cylindrical liner sections for sliding movement relative thereto. This valve is preferrably formed of a series of separable cylindrical valve elements 66, 67 and 68 disposed in end abutting relation. The end abutting portions of the valve elements are reduced to form annular spaces between same and the surrounding internal surfaces of the corresponding liner sections. In this connection it should be noted that the righthand valve element 68 comprises an intermediate reduced portion 69 uniting enlarged cylindrical portions 71 and 72 which in turn terminate in reduced oppositely projecting end portions. The lefthand reduced end portion abuts the enlarged portion on adjacent valve elements 67 and the other or righthand end portion projects through a coaxial opening in end plate 50. This reduced righthand end portion of valve element 68 has an enlarged striking plate 73 which limits the lefthand movement of the valve element by contacting the end plate 50. The valve elements are held in end abutting relation by means of a compression spring (not shown) in the lefthand end of the control valve casing 49.

A pressure manifold 74 is connected in fluid communication with the interior of the control valve casing 49 through the transfer passages 52 corresponding in number to the number of large pump plungers 36. Each transfer passage 52 is preferably provided with a spring biased ball check valve 76 of any conventional design. These valves require only a minimum amount of pressure to open the transfer passages from the control valve to the manifold 74. However, they block the backflow of fluid from the manifold to the control valve. As viewed in FIG. 2 the righthand end of the pressure manifold 74 is connected in fluid communication with the working fluid passage 62 through another spring biased ball check valve 77.

In diametrically opposed relation to the small pump plunger discharge passage 45 is the transfer passage 53 which is in fluid communication with the control valve. The transfer passage 53 does not communicate with the pressure manifold 74 but is connected to the working fluid passage 61 through a second fluid conduit or linking passage 79. A conventional spring biased ball check valve 81 is provided in the linking passage to block the return flow of fluid from the linking passage to the control valve. In downstream relation, that is, in the direction of pressure fluid flow, to the pressure manifold 74 and the linking passage 79 in the working fluid passage 61 is a manually operable ball check valve or hold positioning valve 82. The hold positioning valve consists of a hollow cylindrical housing which provides a valve seat in the interior thereof for a ball valve 83. The ball valve 83 is resiliently contained on the seat by a spiral compression spring 84. A plunger 86 slidably contained in the housing is manually movable to force the ball valve 83 from its seat allowing fluid to flow in either direction. The lift ram 29 is connected to the discharge side of the hold positioning valve 82 by the fluid delivery conduit 32.

With further reference to FIG. 2 the lefthand portion of the pressure manifold 74 communicates with the lefthand portion of an unloading valve generally designated 87. The unloading valve is composed of a cylindrical casing 88. The righthand end of the unloading valve casing has an end plate 89 attached thereto. The righthand end portion of the unloading valve is connected by means of the bypass passage 93 to the fluid reservoir 42. The lefthand end of the unloading valve 87 has a plug 91 therein.

At this point it can be seen that the three large plungers are connected through the pressure manifold 74 with the unloading valve 87. The unloading valve therefore limits the maximum pressure which can be built up by these three large plungers. Also provided in the fluid circuit of the small plunger 37 is a conventional relief valve 94 connecting the discharge passage 45 of the small plunger with the fluid reservoir 42. This relief valve limits the amount of pressure that can be developed by the small pump plunger 37.

A control lever 96 is connected to the hand control lift lower lever 34 (shown in FIG. 1) through suitable linkage including a connecting rod 97. Angular movement of the hand control lever 34 causes the control lever 96 to be pivoted about its connection to the control rod 97. The control lever 96 has a striking surface 98 which is selectively engageable with the plunger 86 of the hold positioning valve 82. An additional striking surface 99 of the control lever is selectively engageable with the striking plate 73 of the control valve.

A more detailed disclosure of the hydraulic system disclosed to this point is found in United States Patent No.

2,926,496 of Edward B. Heckenkamp, issued March 1, 1960, on a Hydraulic Pump.

Figure 3:
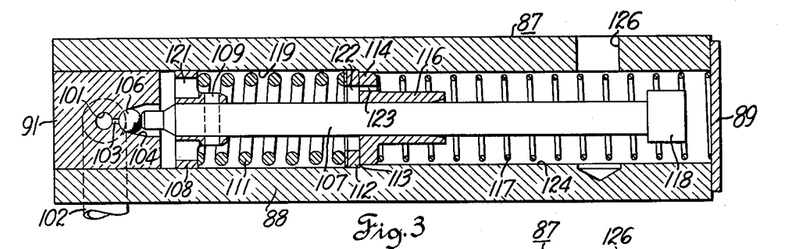
FIG. 3 is a sectional view of one form of a delay action unloading valve with the parts thereof arranged in a closed position.

Referring to FIG. 3 one form of unloading valve is disclosed. The plug 91 contains a transverse bore 101 which is in fluid communication with the pressure manifold 74 through the conduit 102. An axially extending bore or inlet passage 103 connects the transverse bore 101 with a ball valve seat 104 formed on the inner end of the plug 91. A first valve or ball valve 106 is held on the seat 104 by means of a rod 107. A spring retainer 108 is rigidly attached to the rod 107 adjacent to the inlet or ball valve 106 in any conventional manner such as by a pin 109 passing through the retainer and plunger. This piston 108 is slidably contained within the casing 88 of unloading valve 87. A spiral compression spring 111 or first biasing means resiliently urges the rod into engagement with the ball valve 106. This spring has one end seated on the retainer 108 and has its other end seated on a disk 112 which abuts against a shoulder 113 formed on the inner cylindrical surface of the unloading valve casing 88. In the reduced portion of the unloading valve 87 a piston or second valve 114 is provided. This piston or outlet valve is preferably provided with an elongated hub portion 116 having a bore therein which allows the piston 114 to freely slide on the rod 107. An additional spiral compression spring or second biasing means 117 encircles the righthand end of the rod 107 along its axial length and has one end thereof in engagement with the piston 114. The opposite end of the spring 117 abuts against the end plate 89 of the unloading valve 87. The arrangement of the spring 117 resiliently urges the piston 114 against the disk 112. An enlarged cylindrical portion 118 is provided at the end of the rod 107 remote from the ball valve 106.

As shown in FIG. 3, the unloading valve is in a closed position. This condition exists when the pressure in the hydraulic circuit is below the pressure required to unseat the ball valve 106. The operation of the modification of the valve disclosed in FIGS. 3, 4 and 5 will now be described. When the hand control lever 34 is moved to a full lift position the three large plungers 36 and the one small plunger 37 immediately deliver a large quantity of high pressure fluid to the lifting ram 29. The ram piston starts to extend and immediately exerts a lifting force through the lift linkage on the implement 12. Because of its inertia force which resists movement the implement causes a large pressure to be built up in the system. It is quite possible that the pressure of the fluid will momentarily rise above the maximum or first pressure of the unloading valve as regulated by the size of the spring 111 and the projected area of the ball 106 which is exposed to the fluid. When this occurs the ball 106 is momentarily removed from its seat and allows a small quantity of fluid to pass through the axial bore 103 into the enlarged chamber 119 through the axial openings 121 provided in the retainer 108. If this high pressure surge is only of short duration the enlarged chamber or fluid containing means 119 may only partially fill with fluid causing the pressure in the system to drop below the first pressure and the ball valve 106 will reseat. The fluid which is then trapped in the enlarged chamber 119 passes through the opening 122 provided in the disk 112 and through a bleeder port or restricted passage means 123 provided in the piston 114. Once in the smaller chamber 124 the fluid is allowed to pass through the outlet port 126 and to the reservoir through the relief passage 93.

In some cases the duration of the high pressure surge will cause sufficient fluid to pass through the ball valve 106 into the enlarged chamber 119 so that the bleeder port 123 cannot accommodate all of the fluid flowing into the chamber. When this occurs pressure builds up in the chamber 119 and acts on the piston 114 compressing the spring 117. Some of the fluid will pass through the bleeder port 123, however, this port is of such a size that only a limited amount of the fluid flowing into the chamber 119 will bleed therethrough. As the chamber 119 fills with fluid the pressure rises to a critical pressure as regulated by the size of the surface of the piston 114 acted upon by the fluid and the rate of the spring 117. This critical pressure is lower than the maximum pressure required to unseat the ball valve 106 and when reached causes the piston 114 to move to the right along the rod 107. Before the unloading valve is completely opened the piston 114 can be moved to the right to the position shown in FIG. 4. In this position if the high pressure surge has passed, the piston 114 will not move beyond the port 126. The ball valve will then reseat and the fluid in the unloading valve chambers 119 and 124 will pass through the bleeder port 123 and out through the port 126 to the reservoir thereby allowing the piston 114 to return to the position shown in FIG. 3 under the urging of spring 117.

Figure 4:
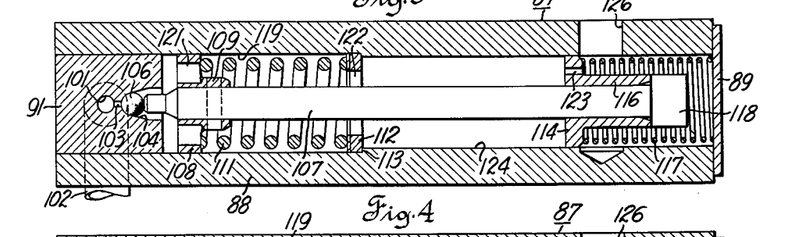
FIG. 4 is a sectional view similar to FIG. 3 showing the parts of the unloading valve arranged in a condition wherein the valve is about to be fully opened.
Figure 5:
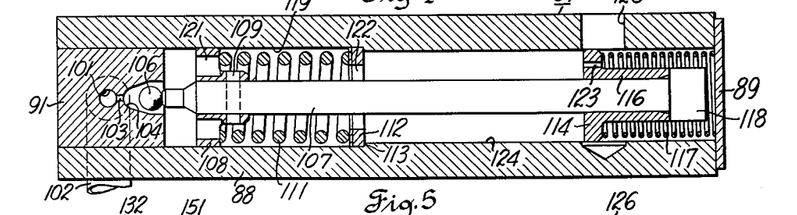
FIG. 5 is a sectional view of the unloading valve disclosed in FIGS. 3 and 4 with the parts thereof arranged in a condition wherein the valve is fully open and the fluid is being bypassed to a reservoir.

Once the ram 29 has reached the limit of its extension the full volume of pressure fluid from the three large plungers 36 is directed to the unloading valve. Since the port in piston 114 is small, a substantial resistance is offered to the passage of even the minimum full output of the pump. Therefore, sufficient pressure acts on the piston to move it against the action of the spring 117 until the hub portion 116 contacts the enlarged portion 118 at the end of the rod 107. Once the hub has contacted the enlarged portion 118 additional movement of the piston 114 to the right moves the rod 107 to the right removing the biasing pressure of the spring 111 from the ball valve 106. The ball is then allowed to be displaced from its seat and the fluid passing through the unloading valve is directed back to the reservoir through the relief passage 93. Since the fluid contact surface of the piston 114 is considerably larger than the fluid contact surface of the ball valve 106 and the rate of the spring 117 is much lower than the rate of the spring 111 the pressure required to retain the rod 107 out of engagement with the ball valve 106 is considerably less than the pressure initially required to unseat the ball valve 106.

With this described action of the unloading valve it can be seen that excessively high pressure surges in the system can be bled through the valve without prematurely opening it. As was previously pointed out this is a desirable characteristic as these high pressure surges do occur when a large implement is lifted. If the unloading valve were allowed to completely open when the implement was initially attempted to be lifted, the operator would be required to move the hand control lever to a full lower position to drop the pressure in the system so that the unloading valve could reseat. He would then be required to slowly move the hand lever to the lift position so that the implement could be raised.

Figure 6:
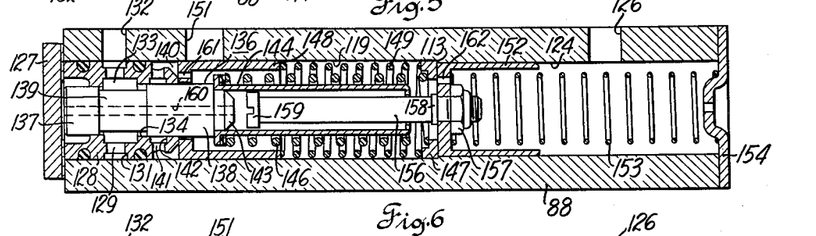
FIG. 6 is a sectional view of a modified form of unloading valve with the parts thereof arranged in a closed position.
Figure 7:
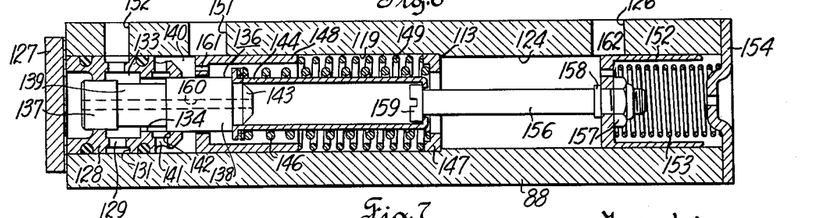
FIG. 7 is a sectional view of the modified unloading valve disclosed in FIG. 6 with the parts thereof arranged in a fully open position and the fluid is being bypassed to the system reservoir.

FIGS. 6 and 7 show an additional form of unloading valve. This additional embodiment has the added advantage that the unloading valve will not prematurely unseat due to high pressure surges regardless of the volume of fluid delivered during these pressure surges. In this embodiment the unloading valve is provided with the identical enlarged chamber 119 and smaller chamber 124 separated by the same shoulder 113. The lefthand end of the unloading valve is closed by a cover plate 127. The lefthand end of the enlarged chamber 119 is provided wtih a cylindrical liner 128. The cylindrical liner is provided with a transverse bore 129 and an annular groove 131 both in fluid communication with the inlet bore 132 of the unloading valve. An annular groove in the inner peripheral surface of the liner 128 provides a fluid chamber 133 in fluid communication with the transverse bore 129. An axially extending bore 134 through the center of the cylindrical liner provides a sliding surface for a spool valve generally designated 136. The spool valve has two axially spaced enlarged portions 137 and 138 joined together by a smaller portion 139 disposed in the fluid chamber 133. The enlarged portion 138 is of a larger diameter than the portion 137 so that there is a tendency for the valve to move to the right when the pressure of the fluid in chamber 133 rises.

To the right of the transverse bore 129 and remote from the fluid chamber 133 is an additional transverse bore 141 through the cylindrical liner 128. This transverse bore is in fluid communication with an annular groove 142 formed in the inner peripheral surface of the cylindrical liner 128. The righthand end portion of the cylindrical liner, through which portion passes the transverse bore 141, is of a smaller outside diameter than the inside diameter of the enlarged chamber 119 and thereby provides an annular fluid chamber 140 between the reduced portion of the liner 128 and the inside surface of the enlarged chamber 119.

The righthand end of the first or spool valve 136 is provided with an annular seating surface 143 which receives in encircling relation thereto an elongated cylindrical tube 144. The lefthand end of the elongated cylindrical tube is held in abutting relation against the righthand end of the enlarged portion 138 of the spool valve 136 by a first biasing means or spiral compression spring 146 having one end engaging the tube. The spiral compression spring is disposed about the elongated tube and has its other end in engagement with a circular disk 147 which is abutting the shoulder 113 of the unloading valve casing 88. The spiral compression spring 146 forces the spool valve 136 against the end plate 127 so that the enlarged portion 138 blocks the annular groove 142 from the fluid chamber 133. The spring 146 is of such a rate that the fluid in the chamber 133 must rise to a maximum or first pressure before the force resulting from the difference in diameter of portions 137 and 138 will cause the valve to move to the right.

A piston or third valve 148 is disposed about the enlarged portion 138 of the spool valve in fluid sealing sliding relation thereto. The outer diameter of the piston or volume control valve 148 is of such diameter as to provide a sliding fluid sealing connection with the inside circumference of the enlarged chamber portion 119 of the unloading valve. A third biasing means or spiral compression spring 149 disposed about the compression spring 146 has one end seated against the circular disk 147 and its other end seated against the piston 148. The spring 149 forces the piston 148 into abutting relation with the reduced righthand end portion of the liner 128. In its closed position as shown in FIG. 6 the piston 148 seals off a volume return passage 151 from the annular groove 142.

An additional piston or second valve 152 is provided in the reduced cylindrical chamber 124 in fluid sealing sliding relation thereto. A spiral compression spring or second biasing means 153 having one end engaged with an end plate 154 has its other end in engagement with the piston or outlet valve 152. In the closed position, shown in FIG. 6, the spring 153 holds the piston in abutting relation against the disk 147. In the preferred form of this embodiment an elongated bolt 156 is connected to the piston 152 in any conventional manner as by a nut 157. The nut is turned onto a threaded portion of the bolt, and holds the piston against annular flange 158 formed on the bolt. The bolt extends axially into the tube 144 and is provided with a head 159 of enlarged diameter. An opening provided through the end of the tube receives the shank of the bolt therethrough and is of a diameter less than the diameter of the bolt head 159. As was true in the previous described embodiment the present embodiment includes the return port 126 in the casing of the unloading valve connecting the reduced chamber 124 with the fluid reservoir 42 through the relief passage 93.

It should be noted that the valve 136 is provided with an axial passage 160 connecting the chamber 119 in fluid communication with the portion of the cylindrical liner section to the left of the enlarged portion 137 of the valve 136. This is to balance the fluid pressure acting on the valve due to back pressure which will develop in the chamber 119.

The rate of the spring 153 is such that the pressure of the fluid acting on the piston 152 must rise to a pressure lower than the first pressure before the spring 153 can be compressed allowing the piston to open. The rate of the spring 149 is such that the pressure of the fluid acting on the piston 148 must rise to a pressure intermediate the first and lower pressures before the spring 149 can be compressed allowing the piston 148 to open. The piston 148 is provided with a bleeder passage means or port 161. This port is of such diameter that only a relatively small volume of fluid as compared to the volume of fluid delivered by the three large plungers can flow therethrough. Since the bore 161 cannot accommodate the total flow of fluid through the chamber 140 the pressure of the fluid in this chamber will rise. When this fluid reaches the intermediate pressure the piston valve 148 will move to the right uncovering the volume control passage 151.

The piston 152 is also provided with a restricted passage means or port 162 connecting the chamber 119 in fluid communication with the chamber 124. This port 162 is also of a small diameter so that it will not accommodate the flow of all the fluid into chamber 119 when the pressure of this fluid is equal to or above the lower pressure.

The embodiment of the delay action unloading valve disclosed in FIGS. 6 and 7 functions in the following manner. Fluid from the pressure manifold 74 is directed to the annular chamber 133 through the bore 132. This fluid acts on the larger surface of the enlarged portion 138, as compared to the surface of portion 137, and when it reaches the first pressure moves the spool valve to the right uncovering the annular groove 142 allowing the fluid to pass through this groove and the transverse bore 141 into the chamber 140. The bleeder port 161 provided in the piston 148 allows some of the fluid to flow through the piston and act upon the piston 152. If the volume of fluid flowing through the transverse bore 141 and acting on the piston 148 is larger than the volume which can be accommodated by the bleeder port 161 the pressure in the chamber 140 will build up to the intermediate pressure causing the piston 148 to move to the right against the urging of the coil spring 149. As the piston 148 moves to the right it uncovers the volume return port 151 allowing a portion of the fluid to pass back to the reservoir. Since there is a pressure differential between the left and righthand sides of the piston 148 due to the force of the spring 149 a portion of the fluid will continue to flow through the bleeder port 161 into the chamber 119. The chamber 119 may or may not be filled with fluid depending on the positioning of the valve and whether or not the fluid in this chamber will drain therefrom by gravity. If the chamber is not completely full it must fill before the pressure acting on the piston 152 is sufficient to move it to an open position. If the rate of flow of fluid into chamber 119 is larger than the rate of flow of fluid that can be accommodated by the port 162 the pressure of the fluid in this chamber will rise to the lower pressure and cause the piston 152 to move to the right. If the surge of high pressure fluid subsides before the piston 152 uncovers the outlet passage 126, the piston 152 will be moved to the left under the urging of spring 153. Any fluid trapped in the chamber 124 to the left of piston 152 will be forced through the port 162 and will flow to the reservoir through the outlet passage 126. The unloading valve has thus passed a surge of high pressure fluid without completely opening at the lower pressure. Because of the volume return valve 148 the time required to move the valve 152 to an open position is not changed by the volume of fluid flowing into the unloading valve. If the surge of high pressure fluid continues for a sufficient length of time the piston 152 will move to the right until bolt head 159 contacts the reduced part of the tube 144. Further movement of the piston 152 to the right compresses the spring 144 removing its biasing effect from the spool valve 136 permitting this valve 136 to remain open at the lower pressure. In this position shown in FIG. 7 the unloading valve is fully open. Because of the larger fluid contact surface of the piston 152 the spool valve 136 is held open at the lower pressure.

It should be understood that valve 148 moves to its open position under conditions of high volume flow and that valve 152 is not only operative under conditions of high volume flow but is also operative under conditions of somewhat lower volume flow to unload the pressure fluid by moving to its open position as shown in FIG. 7, without valve 148 necessarily moving from its closed position as shown in FIG. 6.

From the foregoing description of two embodiments of applicant's invention, it is seen that applicant has provided a fluid control system for an implement and tractor combination wherein pressure surges will not interfere with the desired operation of the implement. Each of the illustrated delayed action unloading valves installed in the bypass passage 102 utilize first and second fluid pressure responsive elements hydraulically in series and independently biased closed. The first element, 106 in FIGS. 3, 4 and 5 and 136 in FIGS. 6 and 7, opens in response to a first predetermined fluid pressure in the main fluid pressure passage 74 and the second element, 114 in FIGS. 3, 4 and 5 and 152 in FIGS. 6 and 7, opens in response to a second predetermined fluid pressure, and in response to a predetermined amount of fluid flow from the first element. The second predetermined pressure is substantially less than the first predetermined pressure. A one way connection is provided in each of the embodiments illustrated in FIGS. 3 and 6, between the first and second valve elements. The one way connection illustrated in FIGS. 3, 4 and 5 includes the rod 107 which is abutted by second valve element 116 when the latter is in its open position as illustrated in FIG. 5. The one way connection of the embodiment illustrated in FIGS. 6 and 7 includes the bolt 156 and tube 144 which are in abutting relation with the second element 152 is in its open position as shown in FIG. 7. In both of the embodiments the one way connection is effective to permit the pressure fluid to maintain the first element in its open position when the second element is in its open position. Flow restricting means in the form of openings 123 and 162 are provided in the second elements of the two embodiments illustrated for permitting restricted fluid flow from between the elements to the reservoir thereby permitting the second valve to return to its biased position as illustrated in FIGS. 3 and 6 when subjected to less than said second predetermined pressure. Thus the delayed action loading valves are operative to permit passage of momentary pressure surges through the bypass passage 102 to the reservoir 42 without reducing the fluid pressure in the motor 29. Thus the motor 29 will perform the function required, which in most instances would be that of lifting the implement or maintaining the implement in a lifted position, even though pressure surges may occur.

It will be apparent to those skilled in the art that various changes and modifications may be made to the invention illustrated and described herein without departing from the spirit of the invention or from the scope of the appended claims.

What is claimed is:

1. In a tractor hydraulic system having a fluid motor, fluid pumping means, a fluid reservoir, pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first normally closed pressure fluid responsive valve in said bypass passage being operative to open at a first pressure; a second normally closed pressure fluid responsive valve located in said bypass passage in downstream relation to said first valve and being operative to open at a pressure lower than said first pressure; fluid containing means in fluid communication with said bypass passage between said first and second valves; restricted passage means permitting fluid to flow to said reservoir from said containing means when said second valve is closed, the volume of fluid flowing through said restricted passage means being less than the volume of fluid flowing into said containing means when the fluid pressure acting on said second valve is at least equal to said lower pressure, and means connecting said first and second valves whereby said first valve is open at said lower pressure when said second valve is open and permitting said first valve to open and close independently of said second valve when said second valve is closed.

2. The combination set forth in claim 1 wherein said restricted passage means is a bleeder port through said second valve.

3. In a tractor hydraulic system having a fluid motor, fluid pumping means, a fluid reservoir, pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first normally closed pressure fluid responsive valve in said bypass passage being operative to open at a first pressure; a second normally closed pressure fluid responsive valve located in said bypass passage in downstream relation to said first valve and being operative to open at a pressure lower than said first pressure; restricted passage means permitting fluid to flow to said reservoir from the upstream side of said second valve when said second valve is closed, the volume of fluid flowing through said restricted passage means being less than the volume of fluid on said upstream side of said second valve when the pressure acting on said second valve is at least equal to said lower pressure; and lost motion means connecting said first and second valves whereby said first valve is open at said lower pressure when said second valve has moved relative to said first valve to said open position and permitting said first valve to open and close independently of said second valve when said second valve is closed.

4. The combination set forth in claim 3 wherein said restricted passage means is a bleeder port through said second valve.

5. In a tractor hydraulic system having a fluid motor, fluid pumping means, a fluid reservoir, a pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first pressure fluid responsive valve in said bypass passage; first biasing means holding said valve in a closed position, said valve being operative to open at a first pressure; a second pressure fluid responsive valve located in said bypass passage in downstream relation to said first valve; second biasing means holding said second valve in a closed position, said second valve being operative to open at a pressure lower than said first pressure; fluid containing means in fluid communication with said bypass passage between said first and second valves; restricted passage means permitting fluid to flow to said reservoir from said fluid containing means when said second valve is closed, the volume of fluid flowing through said restricted passage means being less than the volume of fluid flowing into said containing means when the pressure acting on said second valve is at least equal to said lower pressure; and means connecting said second valve and said first biasing means permitting said first valve to open at said lower pressure when said second valve has moved to an open position and permitting said first valve to open and close independently of said second valve when said second valve is closed.

6. In a tractor hydraulic system having a fluid motor, fluid pumping means, a fluid reservoir, pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first pressure fluid responsive valve in said bypass passage; first biasing means holding said valve in a closed position, said valve being operative to open at a first pressure; a second pressure fluid responsive valve located in said bypass passage in downstream relation to said first valve; second biasing means holding said second valve in a closed position, said second valve being operative to open at a pressure lower than said first pressure; restricted passage means permitting fluid to flow to said reservoir from the upstream side of said second valve when said second valve is closed, the volume of fluid flowing through said restricted passage means being less than the volume of fluid on the upstream side of said second valve when the pressure acting on said second valve is at least equal to said lower pressure; and lost motion means connecting said second valve and said first biasing means permitting said first valve to open at said lower pressure when said second valve has moved relative to said first biasing means to an open position and permitting said first valve to open and close independently of said second valve when said second valve is closed.

7. In a tractor hydraulic system having a fluid motor, fluid pumping means, a fluid reservoir, pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first normally closed pressure fluid responsive valve in said bypass passage being operative to open at a first pressure; a second normally closed pressure fluid responsive valve located in said bypass passage in downstream relation to said first valve and being operative to open at a pressure lower than said first pressure; a third normally closed pressure fluid responsive valve located in said bypass passage between said first and second valves and being operative to open at a pressure intermediate said first and lower pressures; a transverse passage connecting said third valve in fluid communication with said reservoir, said pressure fluid passage and said reservoir being in fluid communication at said intermediate pressure through said transverse passage when said first and third valves are open; fluid containing means in fluid communication with said bypass passage between said second and third valves; bleeder passage means permitting fluid flow from the upstream side of said third valve to said fluid containing means, the volume of fluid flowing through said bleeder passage means being less than the volume of fluid flowing through said first valve when the pressure acting on said third valve is at least equal to said intermediate pressure; restricted passage means permitting fluid flow to said reservoir from said containing means when said second valve is closed, the volume of fluid flowing through said restricted passage means being less than the volume of fluid flowing through said bleeder passage means when the fluid pressure in said containing means is at least equal to said lower pressure; and means connecting said first and second valves whereby said first valve is open at said lower pressure when said second valve is open and permitting said first valve to open and close independently of said second valve when said second valve is closed.

8. In a tractor hydraulic system having a fluid motor, fluid pumping means, a fluid reservoir, pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first normally closed pressure fluid responsive valve in said bypass passage being operative to open at a first pressure; a second normally closed pressure fluid responsive valve located in said bypass passage in downstream relation to said first valve and being operative to open at a pressure lower than said first pressure; a third normally closed pressure fluid responsive valve located in said bypass passage between said first and second valves and being operative to open at a pressure intermediate said first and lower pressures; a transverse passage connecting said third valve in fluid communication with said reservoir, said pressure fluid passage and said reservoir being in fluid communication at said intermediate pressure through said transverse passage when said first and third valves are open; bleeder passage means permitting fluid flow from the upstream side of said third valve to the upstream side of said second valve, the volume of fluid flowing through said bleeder passage means being less than the volume of fluid flowing through said first valve when the pressure acting on said third valve is at least equal to said intermediate pressure; restricted passage means permitting fluid flow to said reservoir from the upstream side of said second valve when said second valve is closed, the volume of fluid flowing through said restricted passage means being less than the volume of fluid flowing through said bleeder passage means when the fluid pressure in said containing means is at least equal to said lower pressure; and lost motion means connecting said first and second valves whereby said first valve is open at said lower pressure when said second valve has moved relative to said first valve to said open position and permitting said first valve to open and close independently of said second valve when said second valve is closed.

9. In a tractor hydraulic system having a fluid motor, fluid pumping means, a fluid reservoir, a pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first pressure fluid responsive valve in said bypass passage; first biasing means holding said valve in a closed position, said valve being operative to open at a first pressure; a second pressure fluid responsive valve located in said bypass passage in downstream relation to said first valve; second biasing means holding said second valve in a closed position, said second valve being operative to open at pressure lower than said first pressure; a third pressure fluid responsive valve located in said bypass passage between said first and second valves; third biasing means holding said third valve in a closed position, said third valve being operative to open a pressure intermediate said first and lower pressures; a transverse passage connecting said third valve in fluid communication with said reservoir, said pressure fluid passage and said reservoir being in fluid communication at said intermediate pressure through said transverse passage when said first and third valves are open; fluid containing means in fluid communication with said bypass passage betweeen said second and third valves; bleeder passage means permitting fluid flow from the upstream side of said third valve into said fluid containing means, the volume of fluid flowing through said bleeder passage means being less than the volume of fluid flowing through said first valve when the pressure acting on said third valve is at least equal to said intermediate pressure; restricted passage means permitting fluid flow from said fluid containing means to said reservoir when said second valve is closed, the volume of fluid flowing through said restricted passage means being less than the volume of fluid flowing through said bleeder passage means when the fluid pressure in said containing means is at least equal to said lower pressure; and means connecting said second valve and said first biasing means to permit said first valve to open at said lower pressure when said second valve is open and permitting said first valve to open and close independently of said second valve when said second valve is closed.

10. In a tractor hydraulic system having a fluid motor, fluid pumping means, a fluid reservoir, pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a first pressure fluid responsive valve in said bypass passage; first biasing means holding said valve in a closed position, said valve being operative to open at a first pressure; a second pressure fluid responsive valve located in said bypass passage in downstream relation to said first valve; second biasing means holding said second valve in a closed position, said second valve being operative to open at a pressure lower than said first pressure; a third pressure fluid responsive valve located in said bypass passage between said first and second valves; third biasing means holding third valve in a closed position, said third valve being operative to open at a pressure intermediate said first and lower pressures; a transverse passage connecting said third valve in fluid communication with said reservoir, said pressure fluid passage and said reservoir being in fluid communication at said intermediate pressure through said transverse passage when said first and third valves are open; bleeder passage means permitting fluid flow from the upstream side of said third valve to the upstream side of said second valve, the volume of fluid flowing through said bleeder passage means being less than the volume of fluid flowing through said first valve when the pressure acting on said third valve is at least equal to said intermediate pressure; restricted passage means permitting fluid flow from the upstream side of said second valve to said reservoir, the volume of fluid flowing through said restricted passage means being less than the volume of fluid flowing through said bleeder passage means when the fluid pressure on said upstream side of said second valve is at least equal to said lower pressure; and lost motion means connecting said second valve and said first biasing means after said second valve has moved relative to said first biasing means to permit said first valve to open at said lower pressure when said second valve is open and permitting said first valve to open and close independently of said second valve when said second valve is closed.

11. A pressure fluid operated delay action unloading valve comprising: a valve casing having a bore therein; a pressure fluid inlet passage in said casing; a fluid outlet passage in said casing; a pressure fluid responsive inlet valve having a closed and open position to interrupt and permit respectively the flow of pressure fluid from said inlet passage to said bore, said inlet valve being moved to said open position upon the attainment of a first fluid pressure in said inlet passage a pressure fluid responsive outlet valve positioned in said bore between said inlet valve and said outlet passage and having a closed and open position to interrupt and permit respectively the flow of fluid from said bore to said outlet passage, said outlet valve being moved to said open position when the fluid in said bore attains a pressure lower than said first pressure; restricted passage means permitting fluid flow from said bore to said outlet passage when said outlet valve is closed, the volume of fluid flowing through said restricted passage means being less than the volume of fluid flowing into said bore when the pressure of the fluid in said bore is at least equal to said lower pressure; and means connecting said inlet and outlet valves whereby said inlet valve is open at said lower pressure when said oulet valve is open and permitting said inlet valve to open and close independently of said outlet valve when said outlet valve is closed.

12. The delay action unloading valve set forth in claim 11 wherein said means connecting said inlet and outlet valves are lost motion means permitting limited movement of said outlet valve relative to said inlet valve before said outlet valve is open.

13. A pressure fluid operated delay action unloading valve comprising: a valve casing having a bore therein; a pressure fluid inlet passage in said casing; a fluid outlet passage in said casing; a pressure fluid responsive inlet valve having a closed and open position to interrupt and permit respectively the flow of pressure fluid from said inlet passage to said bore; first biasing means urging said inlet valve to said closed position, said inlet valve being moved to said open position upon the attainment of a first fluid pressure in said inlet passage; a pressure fluid responsive outlet valve positioned in said bore between said inlet valve and said outlet passage having a closed and open position to interrupt and permit respectively the flow of fluid from said bore to said outlet passage; second biasing means urging said outlet valve to said closed position, said outlet valve being moved to said open position when the fluid in said bore attains a pressure lower than said first pressure; restricted passage means permitting fluid flow from said bore to said outlet passage when said outlet valve is closed, the volume of fluid flowing through said restricted passage means being less than the volume of fluid flowing into said bore when the pressure of the fluid in said bore is at least equal to said lower pressure; and means connecting said outlet valve to said first biasing means to permit said inlet valve to open at said lower pressure when said outlet valve is open and permitting said inlet valve to open and close independently of said outlet valve when said outlet valve is closed.

14. The delay action unloading valve set forth in claim 13 wherein said means connecting said outlet valve to said first biasing means are lost motion means permitting limited movement of said outlet valve relative to said first biasing means before said outlet valve is open.

15. A pressure fluid operated delay action unloading valve comprising: a valve casing having a bore therein; a pressure fluid inlet passage in said casing; a volume control passage in said casing; a fluid outlet passage in said casing; a pressure fluid operated inlet valve having a closed and open position to interrupt and permit respectively the flow of pressure fluid from said inlet passage to said bore, said inlet valve being operative to move to said open position upon the attainment of a first fluid pressure in said inlet passage; an outlet valve in said bore having a closed and open position to interrupt and permit respectively the flow of fluid from said bore to said outlet passage, said outlet valve being operative to move to said open position when the fluid in said bore acting on said outlet valve attains a pressure lower than said first pressure; a volume control valve in said bore between said inlet and outlet valves having a closed and open position to interrupt and permit respectively the flow of fluid from said bore to said volume control passage, said volume control valve being operative to move to said open position when the fluid in said bore between said inlet and volume control valves attains a pressure intermediate said first and lower pressures; bleeder passage means connecting the portion of said bore between said inlet and volume control valves in fluid communication with the portion of said bore between said outlet and volume control valves, the volume of fluid flowing through said bleeder passage means being less than the volume of fluid flowing through said inlet valve when the fluid pressure in the portion of said bore between said inlet and volume control valves is at least equal to said intermediate pressure; restricted passage means connecting the portion of said bore between said outlet and volume control valves in fluid communication with said outlet passage when said outlet valve is closed, the volume of fluid flowing through said restricted passage means being less than the volume of fluid flowing through said bleeder passage means when the pressure of the fluid in the portion of said bore between said outlet and volume control valves is at least equal to said lower pressure; and means connecting said inlet and outlet valves whereby said inlet valve is open at said lower pressure when said outlet valve is open and permitting said inlet valve to open and close independently of said outlet when said outlet valve is closed.

16. The delay action unloading valve set forth in claim 15 wherein said means connecting said inlet and outlet valves are lost motion means permitting limited movement of said outlet valve relative to said inlet valve before said outlet valve is open.

17. A pressure fluid operated delay action unloading valve comprising: a valve casing having a bore therein; a pressure fluid inlet passage in said casing; a volume control passage in said casing; a fluid outlet passage in said casing; a pressure fluid operated inlet valve having a closed and open position to interrupt and permit respectively the flow of pressure fluid from said inlet passage to said bore; first biasing means urging said inlet valve to said closed position, said inlet valve being operative to move to said open position upon the attainment of a first fluid pressure in said inlet passage; an outlet valve in said bore having a closed and open position to interrupt and permit respectively the flow of fluid from said bore to said outlet passage; second biasing means urging said outlet valve to said closed position, said outlet valve being operative to move to said open position when the fluid in said bore acting on said outlet valve attains a pressure lower than said first pressure; a volume control valve in said bore between said inlet and outlet valves having a closed and open position to interrupt and permit respectively the flow of fluid from said bore to said volume control passages; third biasing means urging said volume control valve to said closed position, said volume control valve being operative to move to said open position when the fluid acting on said volume control valve attains a pressure intermediate said first and lower pressures; bleeder passage means connecting the portion of said bore between said inlet and volume control valves in fluid communication with the portion of said bore between said outlet and volume control valves, the volume of fluid flowing through said bleeder passage means being less than the volume of fluid flowing through said inlet valve when the pressure of the fluid in the portion of said bore between said inlet and volume control valves is at least equal to said intermediate pressure; restricted passage means connecting the portion of the bore between said outlet and volume control valves in fluid communication with said outlet passage, the volume of fluid flowing through said restricted passage means being less than the volume of fluid flowing through said bleeder passage means when the fluid pressure in the portion of said bore between said outlet and volume control valves is at least equal to said lower pressure; and means connecting said outlet valve and said first biasing means to permit said inlet valve to open at said lower pressure when said outlet valve is open and permitting said inlet valve to open and close independently of said outlet valve when said outlet valve is closed.

18. The delay action unloading valve set forth in claim 17 wherein said means connecting said outlet valve and said first biasing means are lost motion means permitting a limited amount of movement of said outlet valve relative to said first biasing means before said outlet valve is open.

19. In a tractor hydraulic system having a fluid motor, fluid pumping means, a fluid reservoir, pressure fluid passage means connecting said pump to said motor, fluid return passage means connecting said motor to said reservoir, control means associated with said pressure fluid passage controlling delivery of said pressure fluid to said motor, a bypass passage connecting said pressure fluid passage to said reservoir, a delayed action unloading valve in said bypass passage including first and second fluid pressure responsive elements hydraulically in series and independently biased closed, said first element opening in response to a first predetermined fluid pressure in said fluid pressure passage and said second element being in downstream relation to said first element and shifting to an open position responsive to a second predetermined fluid pressure and to a predetermined amount of fluid flow from said first element, said second predetermined pressure being less than said first predetermined pressure, a one way connection between said elements whereby said first element occupies its open position only when said second element is in its open position and flow restricting means permitting restricted fluid flow from between said elements to said reservoir thereby permitting said second valve to return to its biased position when subjected to less than said second predetermined pressure, said delayed action unloading valve being operative to permit passage of momentary pressure surges through said bypass passage to said reservoir without reducing the fluid pressure in said motor.

References Cited in the file of this patent

UNITED STATES PATENTS

| | | |
|---|---|---|
| 1,889,122 | Hewitt | Nov. 29, 1932 |
| 2,471,859 | Breault | May 31, 1949 |
| 2,611,319 | Strehlow et al. | Sept. 23, 1952 |
| 2,675,751 | Weber | Apr. 20, 1954 |
| 2,777,375 | Carlin et al. | Jan. 15, 1957 |
| 2,847,029 | McRae | Aug. 12, 1958 |
| 2,926,496 | Heckenkamp | Mar. 1, 1960 |

FOREIGN PATENTS

| | | |
|---|---|---|
| 747,674 | Great Britain | Apr. 11, 1956 |

UNITED STATES PATENT OFFICE
CERTIFICATE OF CORRECTION

Patent No. 3,050,037                                          August 21, 1962

Edward B. Heckenkamp

It is hereby certified that error appears in the above numbered patent requiring correction and that the said Letters Patent should read as corrected below.

Column 12, line 60, after "open" insert -- at --;
column 13, line 28, after "holding" insert -- said --;
column 13, line 63, after "passage" insert a semicolon.

Signed and sealed this 12th day of March 1963.

(SEAL)
Attest:

ESTON G. JOHNSON
Attesting Officer

DAVID L. LADD
Commissioner of Patents